J. H. Lord,

Cage Trap.

No. 102,411.  Patented Apr. 26. 1870.

Witnesses
Geo. H. Strong
Wm R. Boone

Inventor
James H. Lord

United States Patent Office.

JAMES H. LORD, OF SAN FRANCISCO, CALIFORNIA.

Letters Patent No. 102,411, dated April 26, 1870.

IMPROVED ANIMAL TRAP.

The Schedule referred to in these Letters Patent and making part of the same

*To all whom it may concern:*

Be it known that I, JAMES H. LORD, of the city and county of San Francisco, state of California, have invented an Improved Animal Trap; and I do hereby declare the following description and accompanying drawings are sufficient to enable any person skilled in the art or science to which it most nearly appertains, to make and use my said invention or improvements without further invention or experiment.

My invention relates to improvements in that class of animal traps in which a revolving wheel, operated by a coiled or other suitable spring, is used.

The arrangement of the wheel in my trap is such that the animal, after entering the chamber in which the bait is placed, and releasing the spring bolt which retains the wheel in its position, by endeavoring to carry away the bait, is caught by the descending wing of the wheel, and forced along into a box or inner chamber, from which the descending wing has cut off all retreat.

A large box or cage is attached to the wheel-house, which connects through a door-space with the chamber into which the animal has been forced, and a light gate so arranged as to permit the animal to pass into this cage, while it will not be possible for it to return In order to more fully illustrate my invention, reference is had to the accompanying drawings forming a part of this specification, in which—

Figure 1:
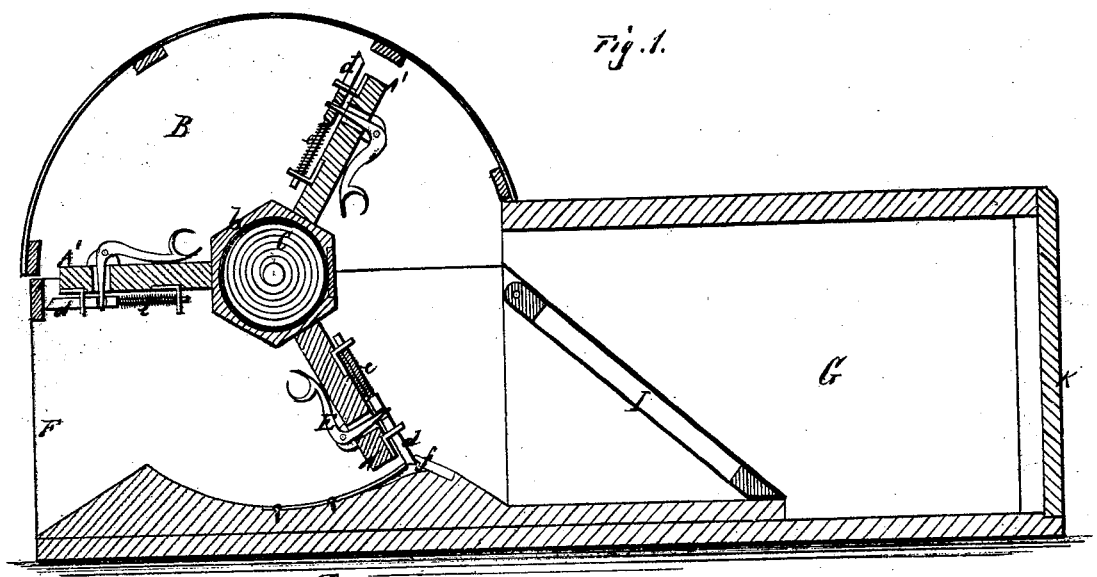
Figure 1 represents a side sectional elevation.
Figure 2:
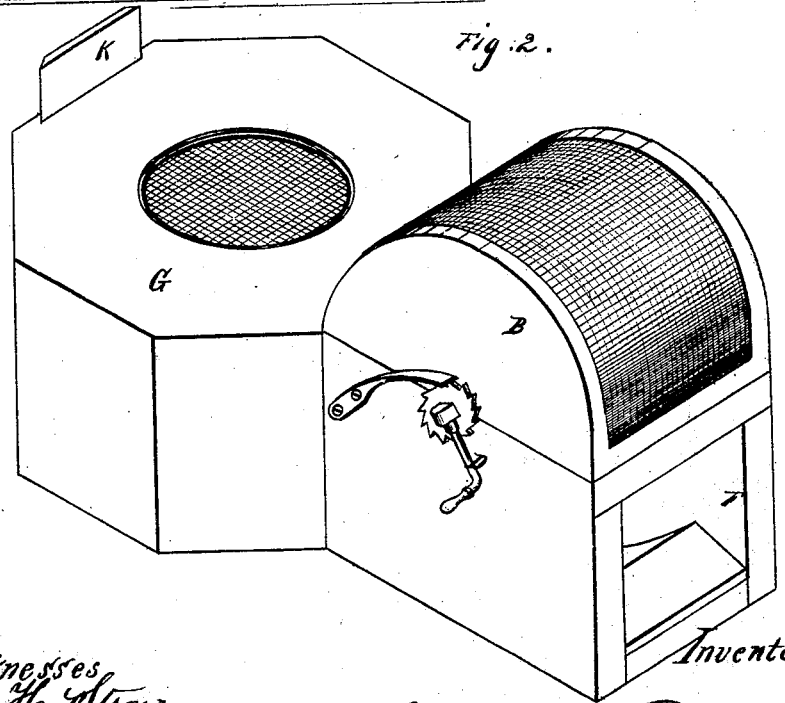
Figure 2 is a perspective view showing more plainly the opening at which the animal enters.

The wheel is here represented with three wings, but it is evident that some other number might be used.

This wheel is revolved inside of a suitable circular box or house, B, by means of a coiled or other suitable spring, C, which is herein represented as coiled around the shaft and inside the central drum $b$ of the wheel, and may be wound up in the usual manner by means of a crank, D, a ratchet and pawl serving to retain the shaft after the spring has been wound up.

Attached at some suitable point on each of the wings A' of the wheel is a sliding bolt, $d$, which is operated by means of a small spring, $e$, to throw it out.

The bottom of the chamber in which this wheel revolves is made on a curve, so as to allow the wings to sweep along it.

A catch, $f$, is arranged at the inner edge of the curved floor, so as to catch the bolt $d$ and retain the wheel until it is released.

A suitable lever, E, made in the form of a bell-crank, has one of its arms passing through the wings A', and secured to the bolt $d$, while the opposite arm extends upward on the opposite side of the wing, and has its upper end formed into a hook for holding the bait.

The animal is supposed to enter the small house, inside of which the wheel revolves, at the opening F, and upon his attempting to carry away the bait he releases the bolt $d$. As the wheel is then revolved by the spring, the descending wing strikes the animal, and by its force drives him to the inside of the wheel, while the wheel immediately sets itself for another victim.

The animal, in its efforts to escape, will attempt to pass into the large cage or chamber G, which he may do by running against the inclined gate I, which is hinged at the upper end. After he has once passed through this gate, it will be impossible for him to return, or in any manner liberate himself.

A small sliding door, K, is arranged on the cage G, through which the caged animals may be removed when desired.

Having thus described my invention,

What I claim and desire to secure by Letters Patent, is—

The revolving wings A', the box B, having a curved floor corresponding to the movement of the arms, the crank E, provided with a bait-hook, the spring bolt $d$, and the cage G, provided with the hinged gate I, when said parts are combined together and arranged to operate as herein set forth.

In witness whereof I have hereunto set my hand and seal.

JAMES H. LORD. [L. S.]

Witnesses:
 GEO. H. STRONG,
 WM. R. BOONE.